United States Patent [19]

Gerson

[11] Patent Number: 5,023,911
[45] Date of Patent: Jun. 11, 1991

[54] WORD SPOTTING IN A SPEECH RECOGNITION SYSTEM WITHOUT PREDETERMINED ENDPOINT DETECTION

[75] Inventor: Ira A. Gerson, Hoffman Estates, Ill.

[73] Assignee: Motorola, Inc., Schaumburg, Ill.

[21] Appl. No.: 266,293

[22] Filed: Oct. 31, 1988

Related U.S. Application Data

[63] Continuation of Ser. No. 817,645, Jan. 10, 1986, abandoned.

[51] Int. Cl.$^5$ .............................................. G10L 7/08
[52] U.S. Cl. ........................................ 381/43; 381/45
[58] Field of Search .................................. 381/41–50; 364/513.5

[56] References Cited

U.S. PATENT DOCUMENTS

| | | | |
|---|---|---|---|
| 4,277,644 | 7/1981 | Levinson et al. | 364/513.5 |
| 4,319,085 | 3/1982 | Welch et al. | 381/43 |
| 4,348,553 | 9/1982 | Baker et al. | 364/513.5 |
| 4,349,700 | 9/1982 | Pirz et al. | 364/513.5 |
| 4,400,828 | 8/1983 | Pirz et al. | 381/43 |
| 4,449,190 | 5/1984 | Flanagan et al. | 364/513.5 |
| 4,481,593 | 11/1984 | Bahler | 364/513.5 |
| 4,489,435 | 12/1984 | Moshier | 381/43 |
| 4,590,605 | 5/1986 | Hataoka et al. | 381/43 |
| 4,624,010 | 11/1986 | Takebayashi | 381/43 |

OTHER PUBLICATIONS

"An Efficient Elastic-Template Method for Detecting Given Words in Running Speech", J. S. Bridle, British Acoustical Society Meeting, Apr. 1973.

"Partial Traceback and dynamic Programming", J. C. Spohrer, et al., Proceedings IEEE International Conference on Acoustics, Speech and Signal Processing, pp. 1629–1632, May 1982.

"On the Effects of Varying Filter Bank Parameters on Isolated Word Recognition" by B. A. Dautrich et al., IEEE Trans. on Acoustics, Speech, and Signal Processing, vol. ASSP-31, No. 4, Aug. 1983.

"A Simplified Robust Training Procedure for Speaker Trained, Isolated Word Recognition System", by L. R. Rabiner and J. G. Wilpon, J. Acoustic Soc. Amer., vol. 68, pp. 1271–1276.

"The Harpy Speech Recognition System", by B. Lowerre, Ph. D. Dissertation, Computer Science Dept., Carnegie-Mellon University, 1977.

"Minimum Prediction Residual Principle Applied to Speech Recognition", by F. Itakura, IEEE Trans. On Acoustics, Speech, and Signal Processing, vol. ASSP-23, pp. 67–72, Feb. 1975.

"An Algorithm for Connected Word Recognition" by Bridle, Brown and Chamberlain, Proceedings of the 1982 IEEE International Conferences on Acoustics, Speech and Signal Processing, pp. 899–902.

Primary Examiner—Gary V. Harkcom
Assistant Examiner—David D. Knepper
Attorney, Agent, or Firm—Raymond A. Jenski; Rolland R. Hackbart

[57] ABSTRACT

Word spotting in a speech recognition system without predetermining the endpoints of the input speech. The invention is intended to be implemented in a system which has word templates stored in template memory, with the system being capable of accumulating distance measures for states within each word template. The following steps are used to generate a measure of similarity between a subset of the input frames and a word template. The steps are: a) recording a beginning input frame number for each state to identify the potential beginning of the word; b) accumulating distance measures for at least one state for each input frame; c) normalizing the distance measures by substracting a normalization amount from each distance measure; d) recording normalization information corresponding to the normalization amount for each input frame; and e) determining a similarity measure between the word template and a subset of input frames after a given input frame has been processed. The subset is identified from the beginning input frame number corresponding to an end state of the template, through the given input frame number. The similarity measure is based on the normalized distance measure recorded for the end state. and the normalization information.

23 Claims, 5 Drawing Sheets

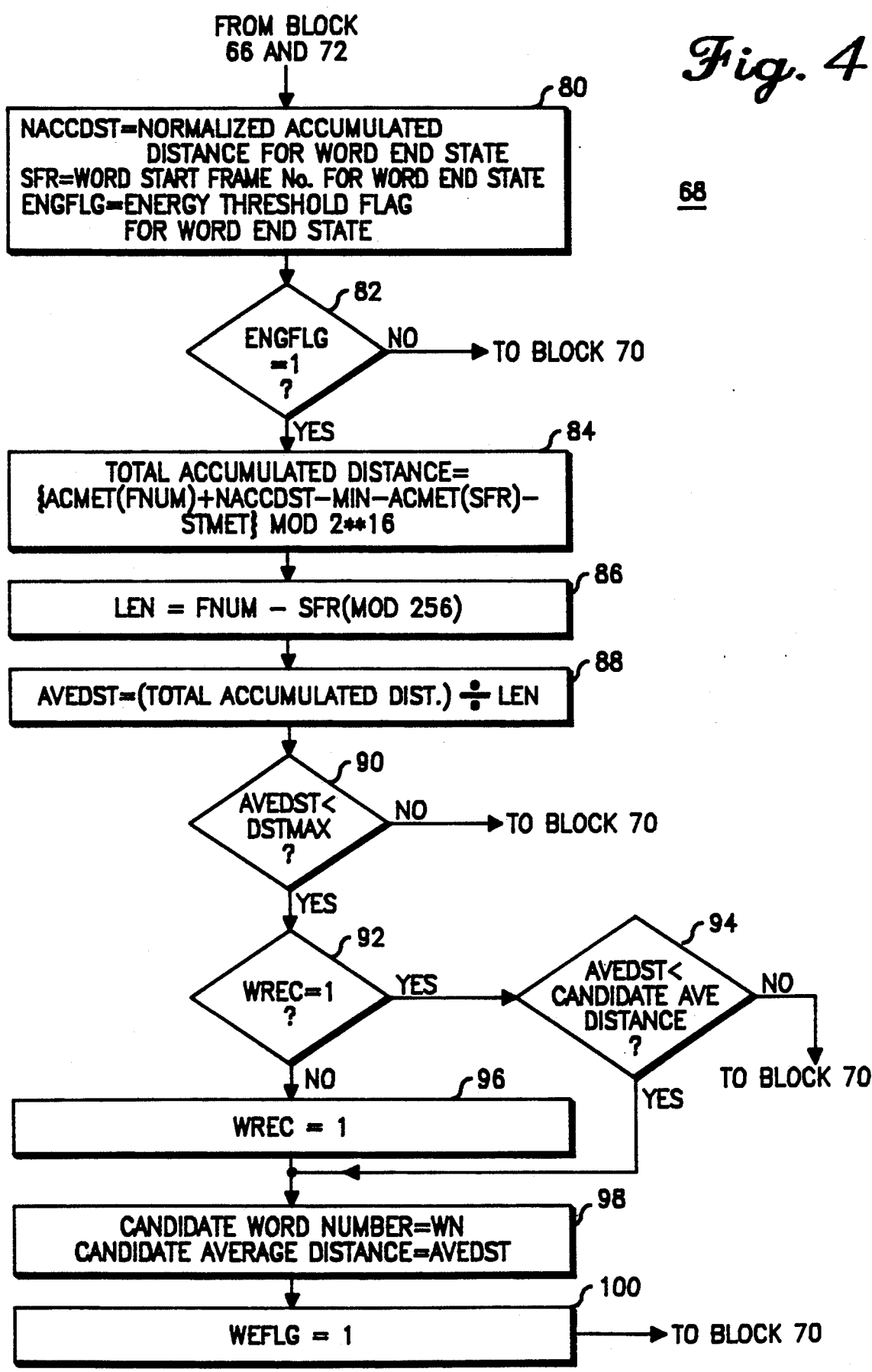

WORD SPOTTING IN A SPEECH RECOGNITION SYSTEM WITHOUT PREDETERMINED ENDPOINT DETECTION

This is a continuation of application Ser. No. 817,645, filed 1-10-86 now abandoned.

BACKGROUND

The present invention relates to word recognition for a speech recognition system and, more particularly, to word recognition without predetermining the endpoints of input words.

Speech recognition systems generally employ word recognition methods to match a word spoken by the system user to a "word template", i.e. a data set in the system representing a spoken word. Traditionally, one of the first steps performed by a typical speech recognition system is determining the endpoints of the speech utterance to define the word to be recognized. It is critical that these endpoints be determined accurately since incorrect endpoints cannot be compensated for later on during the recognition process.

Endpoint detection has proven to be a difficult task. In noisy environments, this difficulty is emphasized due to a lack of acoustic cues indicating a word's starting and ending points. Even in quiet environments, endpoint detection can be hampered because of speaker induced noises such as lip smacks, breathing noises, etc. Notwithstanding noise interference, continuous speech utterances may confuse the endpoint detector if a spoken word is part of a phrase or sentence. Accordingly, endpoint detection is a problem well recognized in the speech recognition field.

Although there have been other attempts of word spotting without predetermined endpoint detection, even those methods that have enjoyed some success have proven to be either computationally prohibitive or they have compromised the system's recognizer performance.

OBJECTS AND SUMMARY OF THE INVENTION

Accordingly, it is an object of the present invention to provide a method of word or utterance recognition which does not require the endpoints of an input word or utterance to be predetermined.

It is a further object of the present invention to provide a method of word or utterance recognition where the input word or utterance may be part of a longer utterance or phrase.

The applicant's invention is directed to word spotting in a speech recognition system without predetermining the endpoints of the input speech. The applicant's invention is intended to be implemented in a system which has word templates stored in template memory, with the system being capable of accumulating distance measures for states, each state representing a segment of speech, within each word template.

The following steps are used to generate a measure of similarity between a subset of the input frames and a word template. The steps are:

a) recording a beginning input frame number for each state to indentify the potential beginning of the word;

b) accumulating distance measures for at least one state for each input frame;

c) normalizing the distance measures by subtracting a normalization amount from each distance measure;

d) recording normalization information corresponding to the normalization amount for each input frame; and e) determining a similarity measure between a word template and a subset of said input frames after a given input frame has been processed. The subset is identified from the beginning input frame number corresponding to an end state of the word template through the given input frame number. The similarity measure is based on the normalized distance measure corresponding to the word template, and the normalization information.

BRIEF DESCRIPTION OF THE DRAWINGS

FIG. 4 is a flowchart illustrating, in detail, a sequence of steps for implementation of block 68 in FIG. 3a, in accordance with the present invention.

DETAILED DESCRIPTION OF THE PREFERRED EMBODIMENT

Figure 1:
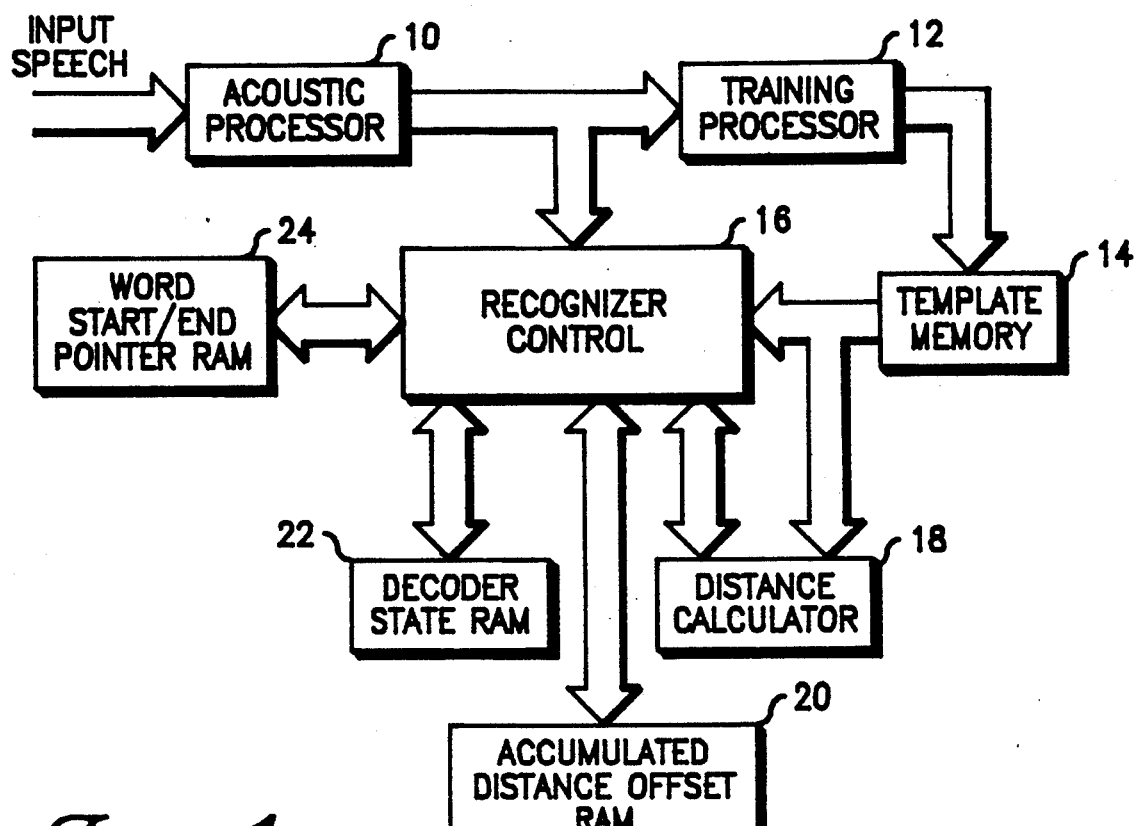
FIG. 1 is a hardware block diagram of a speech recognition arrangement, according to the present invention.

FIG. 1 is a block diagram of a speech recognition arrangement illustrating blocks pertinent to the present invention. Initially, speech is input into the system for establishing a system vocabulary. An acoustic processor 10 converts the speech into feature data, such as filter bank information or LPC parameters. Processing includes segmenting the data in time, each segment being referred to as a frame. This type of acoustic processing is well known in the art. For processing the speech into filter bank information, reference may be made to a paper by B. A. Dautrich et al. entitled *"On the Effects of Varying Filter Bank Parameters on Isolated Word Recognition"*, IEEE Trans. on Acoustics, Speech, and Signal Processing, Vol. ASSP-31, No. 4, Aug. 1983.

A training processor 12 detects endpoints from the converted speech and generates word templates for storage in template memory 14. The word templates are usually stored as a series of states, each representing a segment of speech. Although the term "word template" usually refers to a complete word, it should be understood that it equally applies to segments of speech or short phrases. There are several types of known training processors which can be used to generate the word templates, one of which is described by L. R. Rabiner and J. G. Wilpon in *"A simplified robust training procedure for speaker trained, isolated word recognition systems"*, J. Acoust. Soc. Amer., Vol. 68, pp. 1271–1276, Nov. 1980.

Once training is completed, the training processor 12 is disabled and the system configures itself for speech recognition. The acoustic processor 10 continues to convert the speech into its feature form. Recognizer control 16 accepts the converted speech from the acoustic processor 10, one frame at a time. Each input frame is compared to states stored in template memory 14, and the results of these comparisons are accumulated to generate an ongoing measure of similarity between each word template and the input frames. For further information on frame comparison accumulation techniques using states within each word template, reference may be made to U.S. Pat. Nos. 4,481,593, 4,489,435 and 4,400,828. However, it should be noted that U.S. Pat. Nos. 4,481,593 and 4,489,435 use the term "target pattern" in place of "state", and in U.S. Pat. No. 4,400,828 the term "word template frame" is used.

Although it is not a requirement, a truncated search can be used in the distance accumulation stage of the procedure described herein. Truncated searching strategies are well known in the art. The main idea supporting the various known strategies is to reduce searching time by not prcessing all states for all input frames.

One well known method of truncated searching is referred to as "Beam Decoding". This method may be referenced in B. Lowerre, *"The Harpy Speech Recognition System"*, Ph.D. Dissertation, Computer Science Dept., Carnegie-Mellon University, 1977. This technique reduces search time by not processing those states having an accumulated distance which exceeds the best accumulated distance for all states by a predetermined threshold.

A distance calculator 18 is used for the frame comparisons. One distance calculator which can be used for linear predictive coding type data is described by F. Itakura, *"Minimum prediction residual principle applied to speech recognition,"* IEEE Trans. on Acoustics, Speech, and Signal Processing, Vol. ASSP-23, pp. 67-72, Feb. 1975. For filter bank type data, reference may be made to B. A. Dautrich, supra.

In addition to the distance calculator 18, an accumulated distance offset RAM 20, a decoder state RAM 22 and a word start/end pointer RAM 24 are used in conjunction with the distance calculator to track information recorded during the word spotting process. (The accumulated distance offset RAM 20 is subsequently discussed with FIG. 2.)

The decoder state RAM 22 contains variable information for each state of each word template. Recorded for each state is the following information:

1) a normalized accumulated distance,
2) a word start frame number, modulo 256,
3) an energy threshold flag, and
4) a word end flag.

The accumulated distances are normalized to prevent an accumulator overflow. It is preferred that 16 bits are used for each normalized accumulated distance to allow for substantial accumulations without undue limitations.

The word start frame number is used to estimate the starting input frame for a potentially recognized word, i.e., a word candidate. The word start frame number recorded for a word end state is used to determine a beginning frame number of a potential word candidate. 8 bits are used to record the word start frame number, modulo 256. Storing the word start frame number modulo 256 is adequate if all recognizable input words are less than 256 frames in length, so that the starting frame number can always be uniquely determined.

The energy threshold flag is used to indicate that sometime in the interval from the word start frame to the current frame, the speech energy of an input frame was above a predetermined threshold. The threshold flag is used to ensure that at least one of the input frames had significant speech energy in a potential word candidate. This is used to help prevent the system from attempting to match noise to the word templates.

The word end flag is used to determine when to output the current best candidate word as a recognized word. This flag is used to prevent a word from being output (recognized) if another word which overlaps the candidate word on time, has not yet been fully decoded. For example the word "eat" may be recognized, but the word "repeater" may not yet be fully decoded. This flag is used to ensure that all candidate words are decoded to the end.

The word start/end pointer RAM 24, is used to record pointers corresponding to decoder state RAM 22 locations. The pointers indicate initial starting and ending states for all templates being decoded. Recorded with the pointers are the corresponding word numbers. The pointers are used to direct the recognizer control 16 to appropriate initialization and termination of potential candidate word templates. The word numbers are used to represent the word number associated with a given template.

It should be noted that the accumulated distance offset RAM 20, the decoder state RAM 22 and the word start/end RAM 24 can all be implemeted using commercially available read-write memory. The recognizer control can also be implemented with commercially available hardware, such as the Motorola type 6800 microprocessor.

Figure 3A:
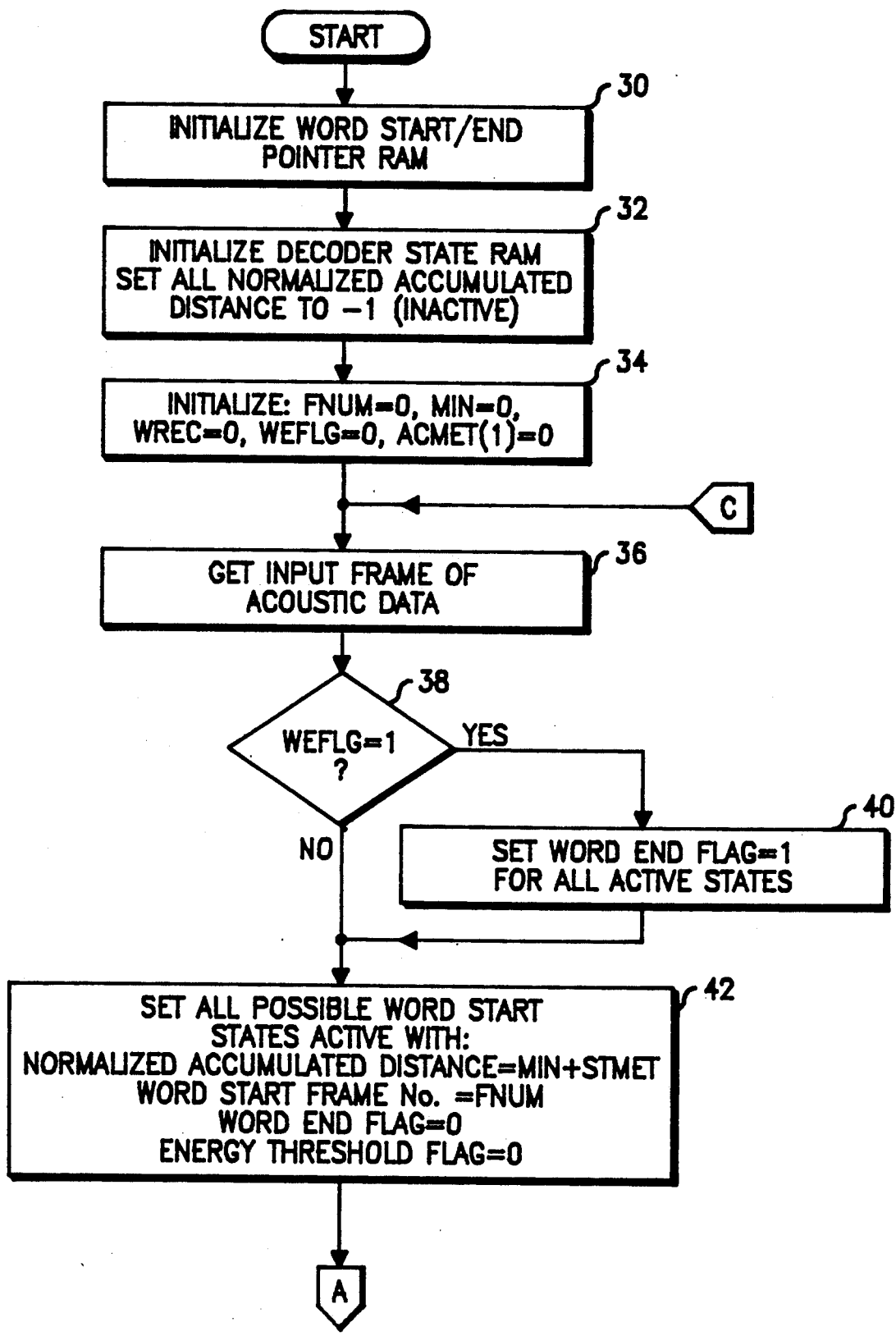
FIGS. 3a, 3b and 3c depict a flowchart illustrating a procedure for word spotting, in accordance with the present invention.

Referring now to FIG. 3a, steps performed by the recognizer control, block 16 of FIG. 1, are shown in flowchart form. The flowchart begins by initializing the word start/end pointer RAM, block 30. This is a one time "write". Each word template has a corresponding word number and pointers indicating at least one beginning state of the word template and at least one ending state of the word template stored in the word start/end pointer RAM.

At block 32, the decoder state RAM is initialized to negative one for all normalized accumulated distances. This is done to inactivate each state for a truncated search implementation. Since no input frames have yet been processed, there are no accumulated distances, and all states are inactive.

At block 34, a third initialization is done on five variables. The first variable FNUM is a counter indicating the current frame number, modulo 256. FNUM is initialized to zero, since, no input frames have yet been processed.

Figure 2:
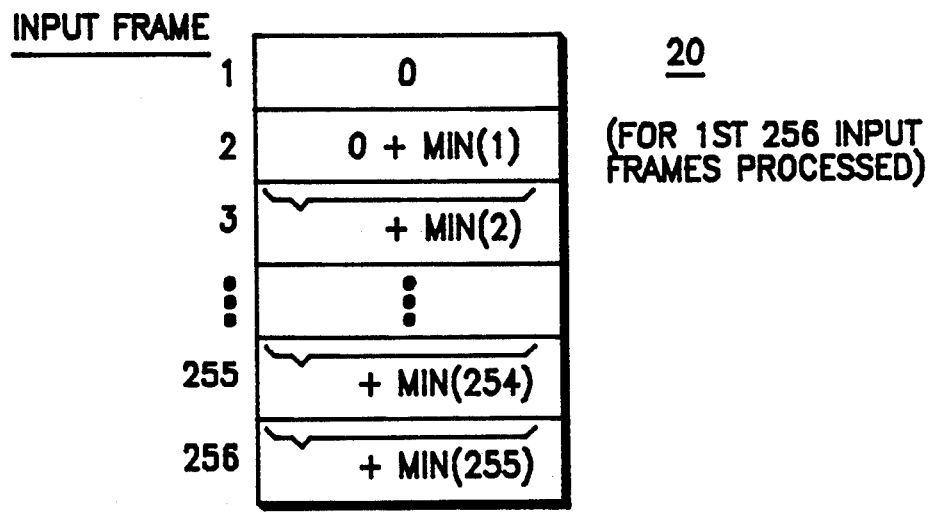
FIG. 2 is an illustration of a memory array used for recording the accumulated distance offset associated with the last 256 input frames, in accordance with the present invention.

The second variable ACMET(j) is from an array containing 256 accumulated distance offsets, where $1 \leq j \leq 256$. FIG. 2 shows this array with frame 1 initialized to zero. Each location of the array is updated as each input frame is processed. The entry updated corresponds to FNUM. The accumulated distance offset represents the sum of all normalization offsets up to the current frame. These accumulated distance offsets are used to compute total accumulated distances for word candidates as will be described with FIG. 4. The frame two memory location in the array has stored in it the normalization offset (amount) for frame 2 which corresponds to the minimum of the accumulated distances of all active states in the decoder state RAM after processing frame number 1. The term "active states" refers to those states which are currently being processed, i.e. those states not having a normalized accumulated distance of $-1$. Similarly, frame 3 memory location will have stored in it that which is stored in the frame 2 memory location plus the normalization offset for frame 3. Each subsequent memory location has similar accumulated distance offsets stored. Sixteen bits are used for each ACMET memory location. The accumulated distance offsets are stored modulo $2^{}16$ (65,536). This is sufficient if the total accumulated distance for any word is always less than 216.

Referring again to FIG. 3a, block 34, MIN is initialized to zero. MIN is used to record the minimum of the normalized accumulated distances for all active states. As previously mentioned, the accumulated distances are normalized to prevent accumulator overflow.

WREC is a flag used to indicate valid word candidates. WREC is set when at least one candidate word has been recognized but has not been output yet.

Finally, WEFLG is a flag used to indicate a valid word end frame. Once it is determined that the current input frame, together with the previously processed input frames, potentially matches at least one word template, then WEFLG is set.

The actual state decoding process begins at block 36, where the input frame is retrieved from the acoustic processor. Block 36 is returned to after the current frame has been processed, at which time, a subsequent input frame is retrieved.

A test is performed at block 38 to determine whether or not the present input frame is a valid word end frame. If this test results in the affirmative, the word end flag is set to 1 for all active states. This is illustrated at block 40.

If the present input frame is not a valid word end frame, i.e., WEFLG=0, flow proceeds to block 42. At this point, all potential word beginning states are set active as follows:

1) normalized accumulated distance=MIN+STMET, where STMET is the word start distance offset. STMET is used for a truncated search to help initialize the quality of the candidate word templates to some initial distance which is worse than the best distance, MIN, but better than the truncating threshold;

2) word start frame number=current frame number, mod (256);

3) energy threshold flag=0; and 4) word end flag=0.

Figure 3B:
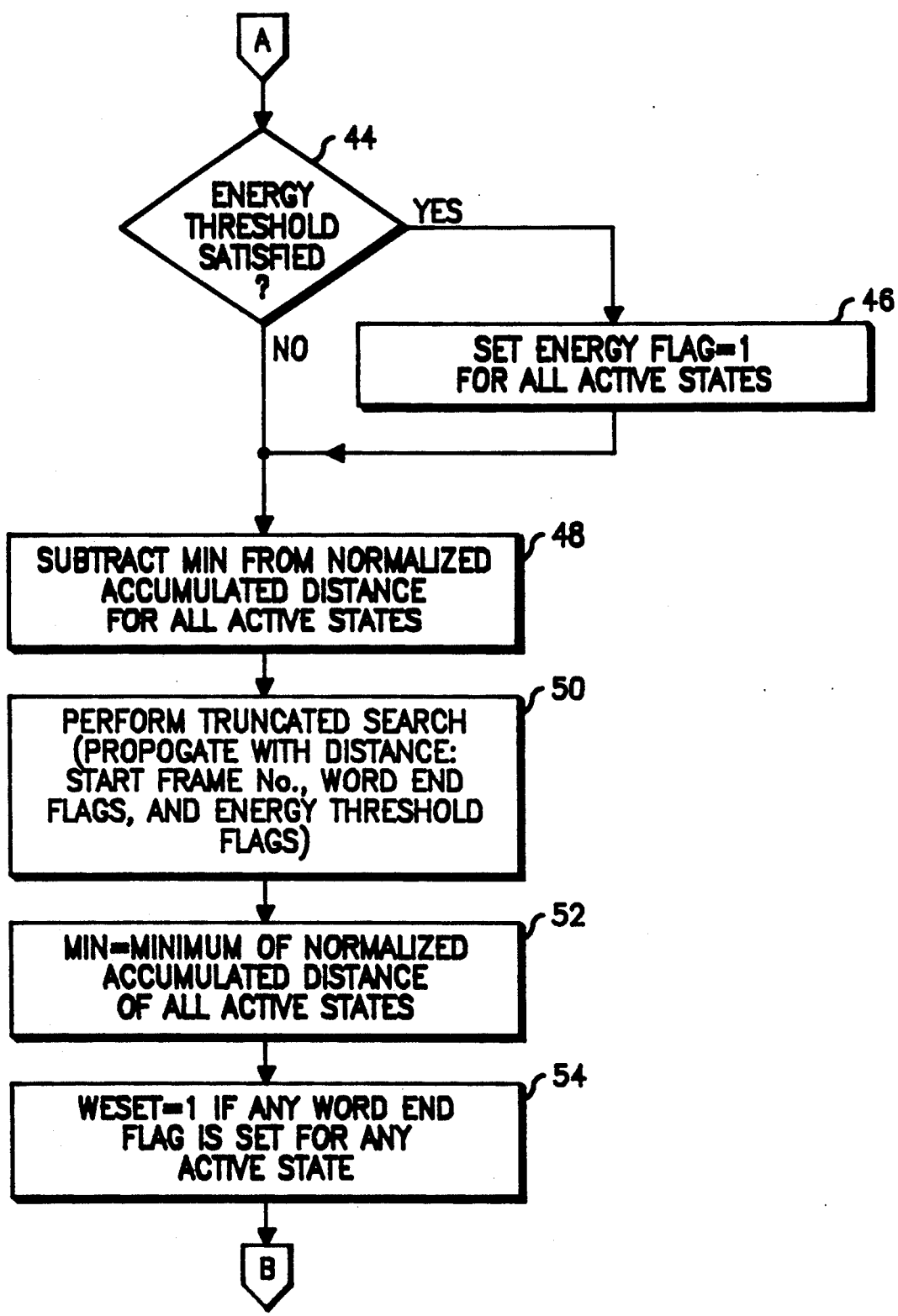

At block 44 of FIG. 3b, a test is performed to determine whether or not the input frame exceeds the predetermined energy threshold. If the condition is satisfied, the energy flag is set equal to 1 for all active states, block 46. Otherwise, flow proceeds to block 48.

At block 48, accumulated distances for all active states are normalized by subtracting the minimum accumulated distance, MIN, from each.

At block 50, the truncated search is performed to update and propagate distance measures calculated for each active state. Also propagated is the variable information stored for each state, such as the word start frame number, the energy threshold flag and the word end flag. Truncated search techniques which propagate information in addition to distance information are well known in the art. For an example, reference may be made to a paper by Bridle, Brown and Chamberlain entitled "An algorithim for connected word recognition", Proceedings of the 1982 IEEE International Conference on Acoustics, Speech and Signal Processing, pp. 899-902.

At block 52, MIN is updated to the new minimum of the normalized accumulated distances for all active states.

At block 54, the word end flags for all active states are "ORed" to determine whether or not at least one state has its word end flag set. The variable where this is result recorded is referred to as WESET (word end flag - set).

It should be noted that blocks 38 through 54 can be more efficiently processed by implementing these steps concurrent with the truncated search of block 50.

Figure 3C:
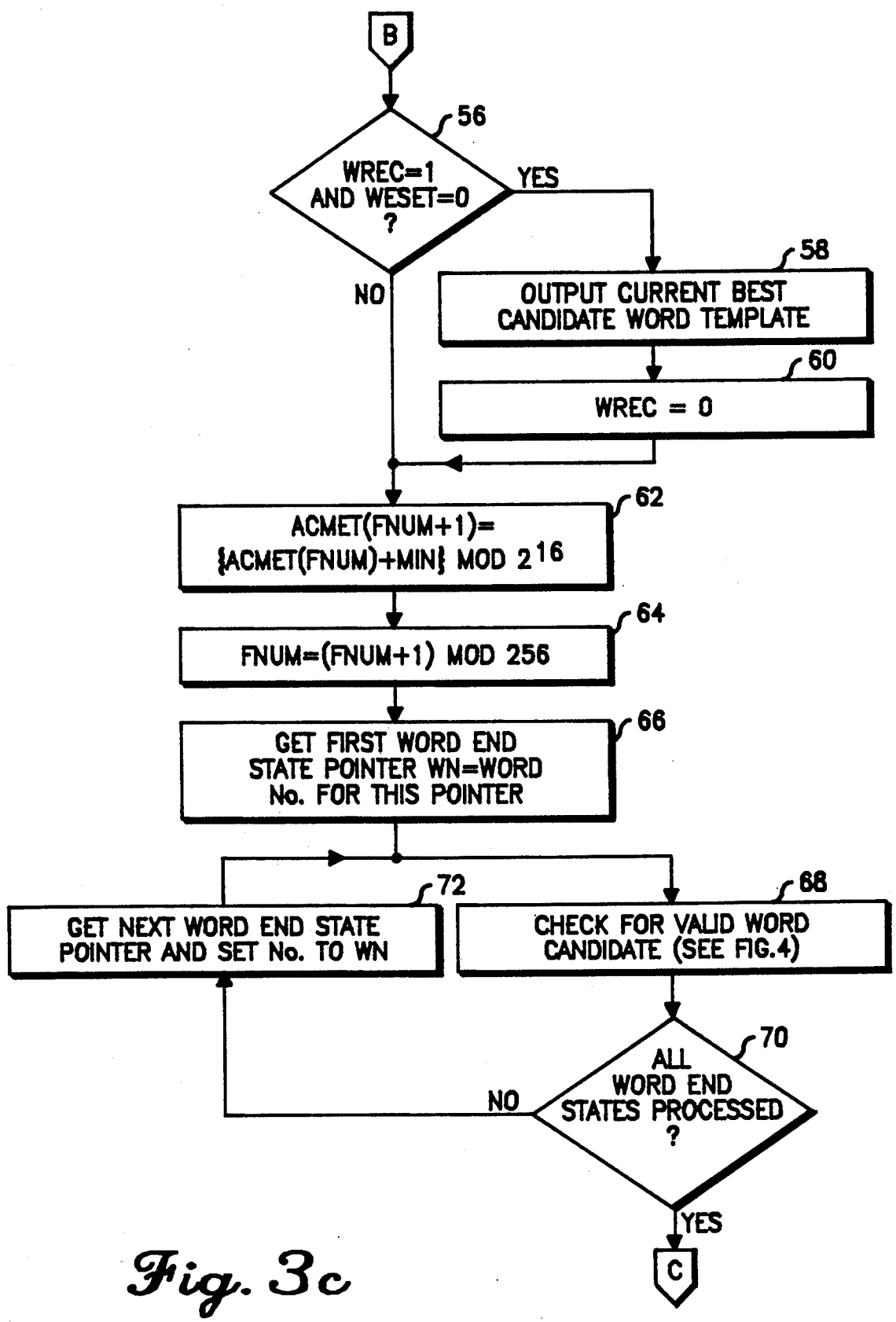

Proceeding to block 56 of FIG. 3c, a test is performed to indicate whether or not to output a recognized word. The condition is true when there is a valid candidate word, WREC=1, and when no active state has its word end flag set, WESET=0. If this condition is satisfied, the best candidate word is output and WREC is reset, blocks 58 and 60, respectively. Otherwise, flow proceeds to block 62.

At block 62, an update is performed on the accumulated distance array (FIG. 2):

ACMET((FNUM+1)mod 256)=(ACMET(FNUM)+MIN)mod 2**16, and at block 64, the frame number, FNUM, is incremented, modulo 256, for the next input frame to be processed.

At block 66, a test to determine the validity of potential word candidates is set up. Each potential end state is pointed to by its respective word end state pointer. The step indicated by block 68 retrieves the first pointer and sets a variable, WN, equal to the word number corresponding to this pointer.

At block 68, a test is performed to determine whether or not the word corresponding to the word end state pointer satisfies the requisite conditions to be a valid candidate word, subsequently discussed with FIG. 4.

At block 70, a test is performed to determine if all word end states have been processed through the steps of block 68. If not, the next word end state is retrieved from the word end/start pointer RAM (block 22 of FIG. 1). Otherwise, processing for the current input frame terminates and the next input frame is retrieved, as indicated by block 36.

At block 72, the next word end state pointer is retrieved and is set equal to the word number corresponding thereto.

Referring now to FIG. 4, block 68 of FIG. 3c is shown in expanded form. At block 80, three variables are initialized from the word end state. The variables are NACCDST (normalized accumulated distance), SFR (the word start frame number corresponding to the current word end state) and ENGFLG (the energy threshold flag).

At block 82, the energy threshold flag is checked to determine if any input frame accumulated for the candidate word had substantial energy. If not, then the word is determined not to be valid and flow returns to block 70 of FIG. 3c.

At block 84, the total accumulated distance is calculated for the corresponding candidate word. The calculated total is:

$$[ACMET(FNUM)+NACCDST-MIN-ACMET(SFR)-STMET]_{mod} 2**16$$

This follows since $[ACMET(FNUM)-ACMET(SFR)-MIN]_{mod} 2**16$=the total amount of offsets that have been subtracted from the candidate word. By adding NACCDST to this total, the total accumulated distance for the candidate word is realized, and by subtracting STMET, the true accumulated distance is realized, to compensate for the initial accumulated distance of STMET from block 42.

At block 86, the number of frames potentially matching the corresponding word template is calculated. LEN (length) is the variable used to store the resultant calculation indicated in block 86 as $[FNUM-SFR]_{mod}$ 256, i.e., the current input frame number minus the word start frame number corresponding to the word end state.

To determine whether or not the potential matching word is accurate, a threshold is used to compare against the average distance of the word. Hence, as shown at block 88, the average distance is calculated as the total accumulated distance divided by the number of frames for the match, from block 86.

The threshold test is shown in block 90. If the average distance calculated exceeds the threshold, the word is determined not to be accurate enough for a match and flow returns to block 70 of FIG. 3c.

At block 92, a test is performed to determine whether or not the valid word candidate flag is set, WREC. If it is set, meaning there is already a valid candidate word, then the two average distances are compared to determine which of the two is more accurate, block 94. If the previous valid word candidate's distance is less than or equal to the current, then the previous remains as the best, and flow returns to block 70 of FIG. 3c. If the previous valid word candidate's distance is greater than the current, then flow proceeds to block 98.

At block 96, if the valid word candidate flag had not been previously set, it is set at this point since all conditions for a valid word candidate have been met.

At block 98, the current valid word candidate is recorded with the current candidate word number and its corresponding average distance, from block 88. The next pass through the flowchart of FIG. 4 will use this recorded valid word candidate as the best thus far. After all overlapping candidate words have been processed through the steps in FIG. 4, the candidate word last recorded, block 88, will be output upon execution of block 58. The word end flags are used to indicate when all potentially overlapping candidate words have been processed, block 56.

Finally, at block 100, the word end state's WEFLG is set to indicate that the state is a valid word end frame. Flow proceeds to block 70 of FIG. 3c for determination of the next potential matching word.

Accordingly, by implementing a speech recognition system in accordance with this flowchart, input speech can be efficiently matched to representative word templates as each input frame is being processed, without the requirement of having to first determine the beginning and ending of each word.

What is claimed is:

1. In a speech recognition system, wherein one or more templates each having a plurality of states representing each template are stored for comparing to a series of input frames, said speech recognition system being able to accumulate distance measures for each comparison of the plurality of states to each frame of the series of input frames, a method for identifying a speech utterance from the series of input frames without using predetermined endpoints, comprising the steps of:

a) identifying a beginning input frame for a first state of a template to identify the potential beginning of the speech utterance;

b) determining a first plurality of distance measures from the comparisons of a first set of states to said beginning input frame;

c) determining a second plurality of distance measures from the comparisons of a second set of states to a second input frame;

d) determining a first normalization amount for said first plurality of distance measures and determining a second normalization amount for said second plurality of distance measures;

e) normalizing said first plurality of distance measures by subtracting said first normalization amount from each distance measure of said first plurality of distance measures and normalizing said second plurality of distance measures by subtracting said second normalization amount from each distance measure of said second plurality of distance measures;

f) accumulating each said determined distance measure of said first plurality of distance measures and accumulating each said accumulated distance measure of said second plurality of distance measures in accordance with a corresponding state from said first and second set of states; and g) determining a similarity measure between said template and a subset of the series of input frames, including said beginning input frame, said second input frame, and a third input frame, said subset identified from said beginning input frame through said third input frame, said similarity measure being based on accumulated distance measures corresponding to the plurality of states representing said template and a summation of the normalization amounts including at least said first normalization amount and said second normalization amount.

2. The method in accordance with claim 1, further including the step of setting the accumulated distance of one or more initial states of each said template relative to a minimum said accumulated distance measure.

3. The method in accordance with claim 1, wherein said summation of normalization amounts corresponds to the minimum of said normalized accumulated distances for all states.

4. The method, in accordance with claim 1, wherein the step of determining a similarity measure further includes the step of calculating the number of input frames in said said subset.

5. The method, in accordance with claim 4, further including the step of calculating an average distance measure per frame for said input frames in said subset.

6. The method, in accordance with claim 5, further including the step of comparing said average distance to a predetermined distance threshold.

7. The method, in accordance with claim 4, further including the step of comparing two or more said average distance measures.

8. The method, in accordance with claim 1, further including the step of determining if the speech energy corresponding to one or more input frames of said subset exceeds a predetermined energy threshold.

9. The method, in accordance with claim 1, wherein the step of accumulating distance measures further includes the step of comparing said distance measures to a truncating threshold.

10. The method, in accordance with claim 1, further including the step of outputting a signal indicating that said template matches said subset after it is determined that no other beginning frame number is less than said given frame number.

11. The method, in accordance with claim 1, wherein the step of recording said beginning input frame number includes recording using modulo arithmetic.

12. The method, in accordance with claim 1, wherein the step of recording said normalization information includes recording using modulo arithmetic.

13. The method in accordance with claim 1 wherein said first set of states further includes said first state.

14. The method in accordance with claim 1 wherein said second set of states further includes said first state.

15. In a speech recognition system, wherein one or more templates, each having a plurality of states, are stored for comparing to a series of input frames, said speech recognition system being able to accumulate distance measures for each comparison of the plurality of states to each input frame processed, a method for identifying a speech utterance from said series of input frames without using predetermined endpoints, comprising the steps of:
   a) recording a beginning input frame number for a first state of a template to identify the potential beginning of said speech utterance;
   b) determining distance measures for each state of the plurality of states of a template for a selected input frame;
   c) determining a normalization amount for said determined distance measures;
   d) normalizing said determined distance measures by subtracting said normalization amount from each said determined distance measure;
   e) accumulating each determined distance measure corresponding to said selected frame for each state of the plurality of states of a template;
   f) repeating steps b), c), d), and e) for each subsequent selected input frame through a given input frame; and
   g) determining a similarity measure between said template and a subset of said input frames after said given input frame has been processed, said subset identified from said recorded beginning input frame number through said given input frame, said similarity measure based on said accumulated distance measures of said subset of input frames and corresponding to the plurality of states representing said template and a summation of said normalization amounts including at least a normalization amount for said input frame and a normalization amount for said given frame.

16. The method, in accordance with claim 15, wherein the step of determining a similarity measure further includes the step of calculating the number of input frames in said said subset.

17. The method, in accordance with claim 15, further including the step of calculating an average distance measure for said input frames in said subset.

18. The method, in accordance with claim 17, further including the step of comparing said average distance to a predetermined distance threshold.

19. The method, in accordance with claim 17, further including the step of comparing two or more said average distance measures.

20. The method, in accordance with claim 15, further including the step of determining if the speech energy corresponding to one or more input frames of said subset exceeds a predetermined energy threshold.

21. The method, in accordance with claim 15, wherein the step of accumulating distance measures further includes the step of comparing said distance measures to a truncating threshold.

22. The method, in accordance with claim 15, further including the step of outputting a signal indicating that said template matches said subset after it is determined that no other beginning frame number is less than said given frame number.

23. The method, in accordance with claim 15, wherein the step of recording said beginning input frame number includes recording using modulo arithmetic.

* * * * *